US010247208B2

(12) United States Patent
Hama

(10) Patent No.: US 10,247,208 B2
(45) Date of Patent: Apr. 2, 2019

(54) SPEED CONTROLLER

(71) Applicant: YUGEN KAISHA HAMA INTERNATIONAL, Okaya-shi, Nagano (JP)

(72) Inventor: Tomio Hama, Okaya (JP)

(73) Assignee: YUGEN KAISHA HAMA INTERNATIONAL, Okaya-shi, Nagano (JP)

( * ) Notice: Subject to any disclaimer, the term of this patent is extended or adjusted under 35 U.S.C. 154(b) by 309 days.

(21) Appl. No.: 15/310,282

(22) PCT Filed: Jul. 6, 2015

(86) PCT No.: PCT/JP2015/069431
§ 371 (c)(1),
(2) Date: Nov. 10, 2016

(87) PCT Pub. No.: WO2016/017377
PCT Pub. Date: Feb. 4, 2016

(65) Prior Publication Data
US 2017/0261008 A1    Sep. 14, 2017

(30) Foreign Application Priority Data

Aug. 1, 2014  (JP) ................................. 2014-157770
Mar. 3, 2015  (JP) ................................. 2015-040833

(51) Int. Cl.
*F16K 31/00*    (2006.01)
*F15B 11/10*    (2006.01)
(Continued)

(52) U.S. Cl.
CPC ............ *F15B 11/10* (2013.01); *F15B 11/048* (2013.01); *F15B 11/0413* (2013.01);
(Continued)

(58) Field of Classification Search
CPC ................ Y10T 137/87418; Y10T 137/86968
See application file for complete search history.

(56) References Cited

U.S. PATENT DOCUMENTS 4,619,287 A * 10/1986 Hanna .................... F16K 15/148
                                                137/512.15
5,081,904 A *  1/1992 Horn ....................... F15B 13/01
                                                91/420

(Continued)

FOREIGN PATENT DOCUMENTS

| JP | 58-28102 U | 2/1983 |
| JP | 2003-254303 A | 9/2003 |
| WO | WO 2005/045257 A1 | 5/2005 |

OTHER PUBLICATIONS

International Search Report, issued in PCT/JP2015/069431 (PCT/ISA/210), dated Oct. 13, 2015.

*Primary Examiner* — Robert K Arundale
(74) *Attorney, Agent, or Firm* — Birch, Stewart, Kolasch & Birch, LLP

(57) ABSTRACT

A speed controller capable of controlling an action speed of an external cylinder in one stroke in a step-wise manner. The speed controller includes a first flow path and a second flow path that allow a first port and a second port to be in communication with each other. The first flow path is provided with a first check valve for allowing flow from the first port to the second port. The second flow path is provided with a first needle valve, and an opening hole of the first check valve is constituted as a part of a flow path. The first needle valve adjusts the flow rate by changing an opening area of the opening hole with a tip portion fixed on a piston in the cylinder chamber. The speed controller further includes a third flow path allowing the first port and the cylinder chamber to be in communication with each other. The third flow path is provided with a second check (Continued)

valve for allowing flow from the first port to the cylinder chamber.

7 Claims, 3 Drawing Sheets

(51) Int. Cl.
| | |
|---|---|
| *F15B 13/02* | (2006.01) |
| *F15B 15/24* | (2006.01) |
| *F16K 15/18* | (2006.01) |
| *F16K 31/122* | (2006.01) |
| *F15B 11/04* | (2006.01) |
| *F15B 11/048* | (2006.01) |
| *F15B 11/06* | (2006.01) |
| *F15B 13/042* | (2006.01) |
| *F15B 15/22* | (2006.01) |

(52) U.S. Cl.
CPC ............ *F15B 13/027* (2013.01); *F15B 15/24* (2013.01); *F16K 15/18* (2013.01); *F16K 31/1221* (2013.01); *F16K 31/1223* (2013.01); *F15B 11/0406* (2013.01); *F15B 11/06* (2013.01); *F15B 13/042* (2013.01); *F15B 15/22* (2013.01); *F15B 2211/40515* (2013.01); *F15B 2211/40584* (2013.01); *F15B 2211/75* (2013.01); *F15B 2211/8855* (2013.01); *Y10T 137/86968* (2015.04); *Y10T 137/87418* (2015.04)

(56) References Cited

U.S. PATENT DOCUMENTS

| | | | |
|---|---|---|---|
| 5,485,867 A | 1/1996 | Stoll | |
| 6,227,231 B1 * | 5/2001 | Hosono | F15B 11/028 137/269.5 |
| 6,296,013 B1 * | 10/2001 | Hosono | F15B 11/0413 137/454.5 |
| 6,745,789 B2 * | 6/2004 | Christiani | F15B 11/0413 137/102 |
| 9,115,811 B2 * | 8/2015 | Yamada | F16K 1/00 |
| 10,030,677 B2 * | 7/2018 | Shishido | F16K 15/00 |
| 2007/0039458 A1 | 2/2007 | Hoshino et al. | |

* cited by examiner

SPEED CONTROLLER

TECHNICAL FIELD

The present invention relates to a speed controller and, more specifically, to a speed controller that is connected to an external cylinder and can control an action speed of the cylinder in a step-wise manner.

BACKGROUND ART

In an automated facility line for assembling machine apparatuses and electronic devices, many apparatuses using a cylinder are used. However, if the cylinder speeds up, its cycle time can be shortened. On the other hand, a problem occurs in which a shock when the cylinder stops is increased to shorten a life of the cylinder.

Conventionally, not to increase the shock when the cylinder stops even if the cylinder speeds up, a method has been generally used in which a shock absorber (for example, oil type) is provided for a mechanism portion to which a piston of the cylinder is connected, so as to reduce the shock when the cylinder stops.

Alternatively, a technique about an air pressure cylinder with a cushion mechanism is disclosed that reduces the shock when the cylinder stops by providing the cylinder itself with a cushion mechanism for reducing the shock (PTL 1).

CITATION LIST

Patent Literature

PTL 1: Japanese Patent Laid-Open No. 2003-254303

SUMMARY OF INVENTION

Technical Problem

However, for example, in a case where a shock absorber is provided to reduce a shock when a cylinder stops, there used to be a problem in which the shock absorber needs to be incorporated in an apparatus, and thus a mechanism becomes complicated and component costs and assembly costs are increased.

The present invention is conducted in consideration of the above described problem. The purpose of the present invention is to provide a speed controller capable of controlling an action speed of an external cylinder in one stroke in a step-wise manner with a simple constitution and without using the shock absorber.

Solution to Problem

A solution disclosed below as an embodiment solves the above described problem.

The disclosed speed controller includes a first flow path and a second flow path configured to allow a first port and a second port each included in a main body portion to be in communication with each other so as to flow pressure fluid, the first flow path including a first check valve permitting only flow from the first port to the second port, the second flow path including a first needle valve for adjusting a flow rate of the flowing pressure fluid, the second flow path being configured to include an opening hole that opens at a center position of the first check valve in a radial direction as a part of the flow path, the first needle valve adjusting the flow rate by allowing a tip portion of a needle shaft to abut on, to be close to, or to proceed into the opening hole so as to change an opening area of the opening hole, the needle shaft being fixed on a piston reciprocately-movably disposed in a cylinder chamber included in the main body portion and also protruding outside the cylinder chamber; and further a third flow path configured to allow the first port and the cylinder chamber to be in communication with each other so as to flow the pressure fluid, the third flow path including a second check valve permitting only flow from the first port to the cylinder chamber.

Advantageous Effects of Invention

According to the disclosed speed controller, a speed controller capable of controlling an action speed of the external cylinder in one stroke in a step-wise manner can be realized with a simple constitution. Therefore, the cylinder operation can be speeded up, and also a shock when the cylinder stops can be reduced without using the shock absorber.

DESCRIPTION OF EMBODIMENTS

Figure 1A:
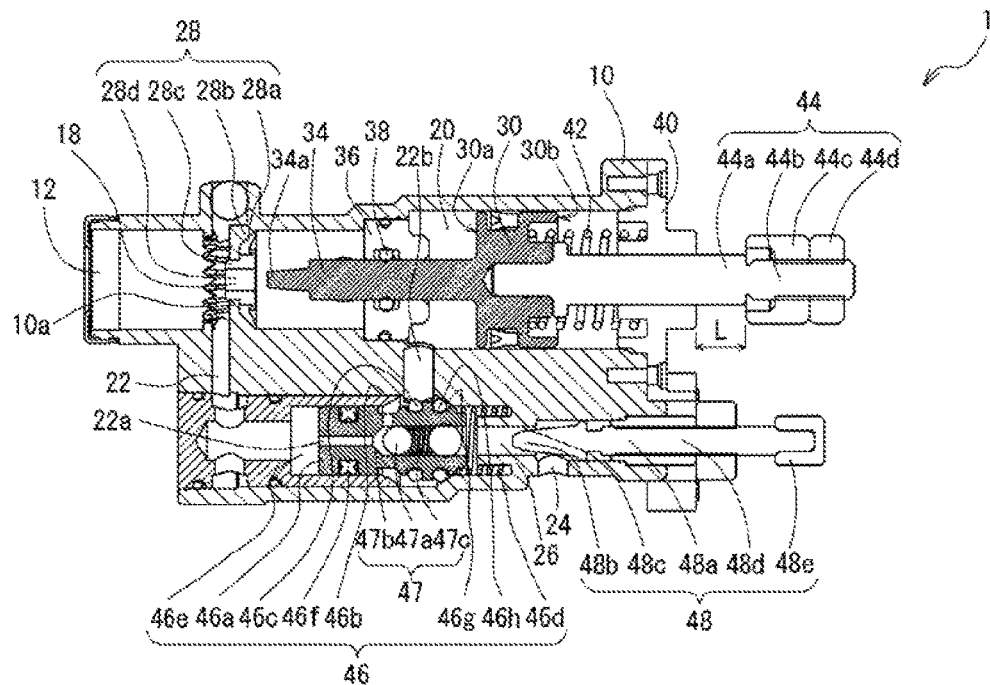
FIGS. 1A and 1B are schematic views illustrating an example of a speed controller according to an embodiment of the present invention.
Figure 1B:
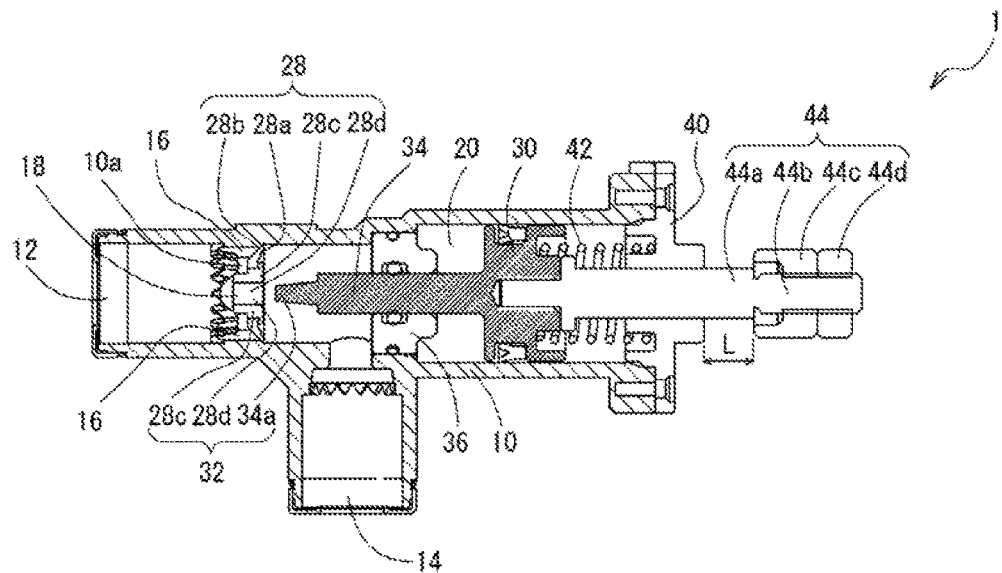
Figure 2:
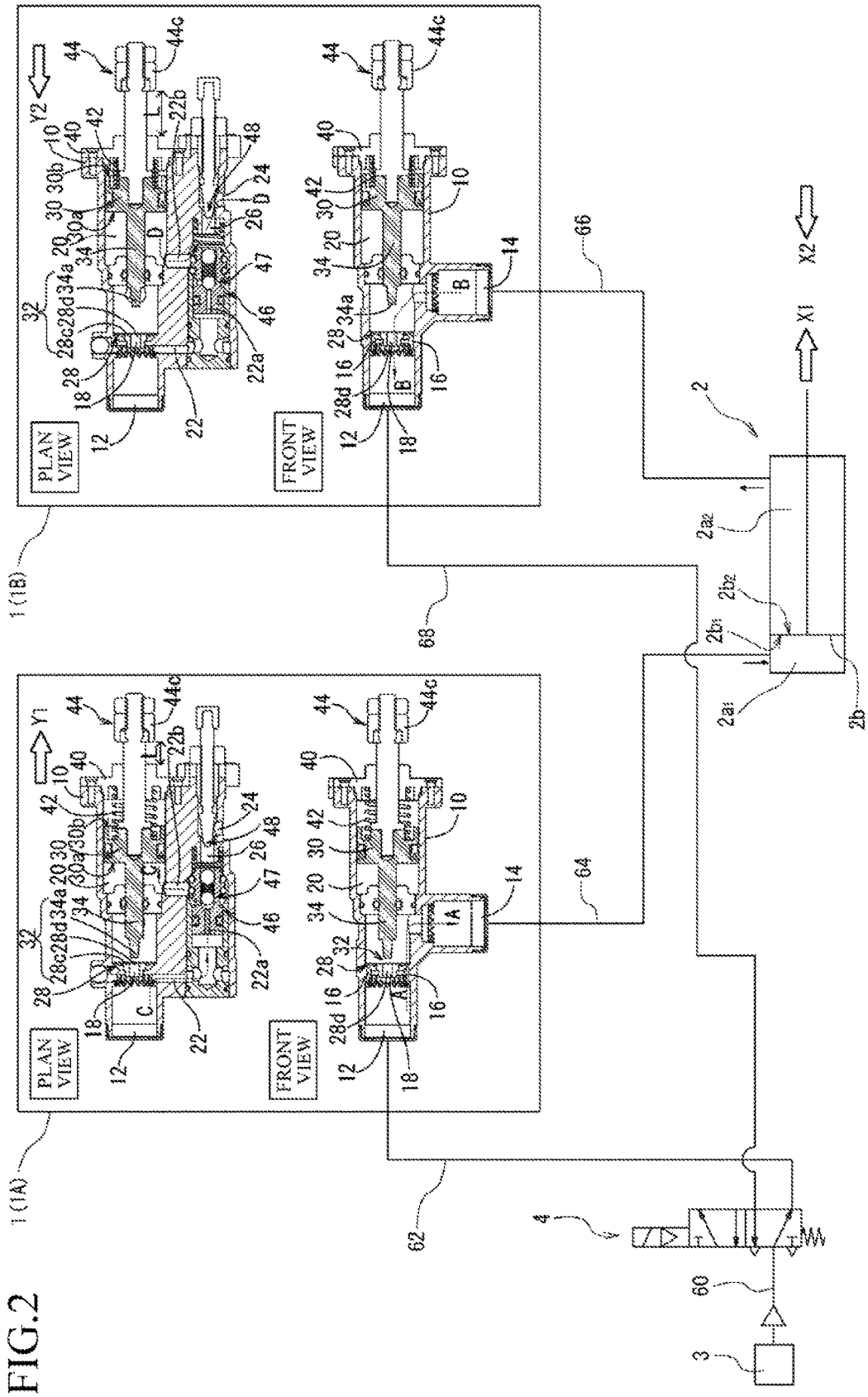
FIG. 2 is a circuit diagram illustrating in a case where the speed controller as illustrated in FIGS. 1A and 1B and an external cylinder are provided.

Hereinafter, an embodiment of the present invention will be described in detail with reference to the diagrams. FIG. 1A is a plan cross-sectional view (schematic view) illustrating an example of a speed controller 1 according to the present embodiment. FIG. 1B is a front cross-sectional view (schematic view). FIG. 2 is a circuit diagram in a case where the speed controller 1 as illustrated in FIG. 1 (herein, two speed controllers 1A and 1B) and an external cylinder 2 are provided. Note that, in all drawings to describe the embodiment, the same reference numbers are applied to members having the same function, and repeated description thereof may be omitted.

The speed controller 1 according to the present embodiment, for example, is incorporated in (connected with) a flow path for flowing pressure fluid (e.g., compressed air) to the external cylinder 2 of a reciprocating type (hereinafter, referred to simply as "cylinder") included in an automated facility line or the like, and controls an action speed of the cylinder 2 in a step-wise manner (e.g., two steps of high speed and low speed).

As illustrated in FIGS. 1A and 1B, and FIG. 2, the speed controller 1 includes a plurality of flow paths for flowing the pressure fluid in a main body portion 10 (details will be described below). Further, inside the main body portion 10, a cylinder chamber 20 is provided for holding a piston 30 to be reciprocately movable.

Note that, as element material of the speed controller 1, except for portions where rubber materials such as a valve element 28a and an O ring 38 described below are used, resin material (e.g., POM, PBT) and metal material (e.g., stainless, brass) are appropriately used depending on usage conditions.

Herein, in the cylinder chamber 20, a housing 36 is provided that separates an inside of the cylinder chamber 20 from an outside thereof (herein, portions of a first flow path 16 and a second flow path 18 in the main body portion 10) at one end side, while maintaining air tightness. Further, at the other end side, a cap 40 is provided that separates the inside of the cylinder chamber 20 from the outside thereof (herein, a portion which is to be the outside of the main body portion 10), while maintaining the air tightness. In other words, the cylinder chamber 20 is constituted to have space formed inside with the main body portion 10, the housing 36, and the cap 40.

On the other hand, as to the above described plurality of flow paths provided in the main body portion 10, more specifically, a first flow path 16 (flow path indicated with an arrow A in FIG. 2) is provided for allowing the first port 12 and the second port 14 to be in communication with each other to flow the pressure fluid. Further, in addition to the first flow path 16, a second flow path 18 (flow path indicated with an arrow B in FIG. 2) is provided for allowing the first port 12 and the second port 14 to be in communication with each other to flow the pressure fluid. Furthermore, a third flow path 22 (flow path indicated with an arrow C in FIG. 2) is provided for allowing the first port 12 and the cylinder chamber 20 formed inside the main body portion 10 to be in communication with each other to flow the pressure fluid. Moreover, a fourth flow path 26 (flow path indicated with an arrow D in FIG. 2) is provided for allowing the cylinder chamber 20 and a discharge opening 24 provided in the main body portion 10 to be in communication with each other to flow the pressure fluid.

First, the first flow path 16 is provided with a first check valve 28 permitting only flow from the first port 12 to the second port 14. The first check valve 28 includes a valve element 28a and a valve seat 28b, and operates to pass the pressure fluid only in a direction indicated with the arrow A in FIG. 2. In other words, when the pressure fluid is flown from the first port 12 side into the first flow path 16, the valve element 28a is separated away from the valve seat 28b under pressure of the pressure fluid to open the flow path. On the other hand, when the pressure fluid is flown from the second port 14 side into the first flow path 16, the valve element 28a comes in close contact with the valve seat 28b under the pressure of the pressure fluid to close the flow path. As an example, the valve element 28a is formed using rubber material such as NBR, and the valve seat 28b is formed integrally with the main body portion 10 using resin material.

Here, the first check valve 28 is provided with an opening hole 28d that opens at a center position in a radial direction. According to the present embodiment, in a state where the ring-shaped valve element 28a is fixed on an outer circumference, a valve element presser 28c that is fitted into and fixed to a protruding portion 10a protruding inside the main body portion 10 is provided. The opening hole 28d is formed at the center position of the valve element presser 28c in the radial direction. As an example, the valve element presser 28c is fitted into and fixed on the protruding portion 10a in a snap-fit engagement structure, which enables simpler assembly (refer to FIGS. 1A and 1B, and FIG. 2).

Subsequently, the second flow path 18 is constituted such that the opening hole 28d that opens at the center position of the first check valve 28 in the radial direction forms a part of the flow path.

Further, the second flow path 18 is provided with a first needle valve 32 adjusting a flow rate of the flowing pressure fluid. More specifically, the first needle valve 32 is constituted to adjust the flow rate by allowing a tip portion 34a of a needle shaft 34 to abut on, to be close to, or to proceed into the opening hole 28d of the first check valve 28 so as to change an opening area of the opening hole 28d.

According to the present embodiment, the needle shaft 34 is fixed on the piston 30 reciprocately-movably disposed in the cylinder chamber 20, thereby being able to reciprocately move together with the piston 30 in a shaft direction. Note that, although the needle shaft 34 and the piston 30 are integrally formed as one example, they may be separately formed from each other.

Further, the needle shaft 34 is constituted to be inserted through the housing 36 at the one end side of the cylinder chamber 20 so that the tip portion 34a is protruded outside the cylinder chamber 20. Note that the housing 36 through which the needle shaft 34 is inserted is provided with the O ring 38 made of rubber at a sliding position, and thus the needle shaft 34 can move in the shaft direction with air tightness maintained with respect to the housing 36.

As described above, in addition to the function as a check valve, the first check valve 28 according to the present embodiment can also function as a needle valve by using the opening hole 28d of the valve element presser 28c in combination with the tip portion 34a of the needle shaft 34. According to this, compared with the constitution in which the check valve and the needle valve are separately provided, the structure can be more simplified, the number of components can be reduced, thereby being able to reduce the assembly costs and the component costs.

Further, in a direction reducing volume in the cylinder chamber 20, and also in a direction allowing the tip portion 34a of the needle shaft 34 to abut on, to be close to, or to proceed into the opening hole 28d (or, both directions of the direction described above and the opposite direction), a moving member that moves the piston 30 and the needle shaft 34 is provided.

A constitution is adopted in which, as the moving member, for example, an urging member (e.g., mechanism in which a movement is caused by an urging force of the urging member), or a motor (e.g., mechanism in which a movement is caused by using a stepping motor driven by a control unit, a rack and pinon, a ball screw, or the like) is used.

As an example, according to the present embodiment, the urging member is used as the moving member. More specifically, as the urging member, a first urging member 42 (e.g, coil spring, and other spring members) is provided such that one end of the first urging member abuts on the piston 30 and the other end thereof abuts on the cap 40 in the cylinder chamber 20. The first urging member 42 generates the urging force for moving the piston 30 and the needle shaft 34, in the direction reducing the volume in the cylinder chamber 20, and also in the direction allowing the tip portion 34a of the needle shaft 34 to abut on, to be close to, or to proceed into the opening hole 28d. Note that, as a modification of the first urging member, the first urging member may be constituted to generate the same urging force as that described above so that pressure of the pressure fluid (compressed air, etc.) is applied to other end 30b side of the piston 30 (not illustrated).

Further, an adjustment member capable of defining a stop position (i.e., stop position of the tip portion 34a of the needle shaft 34) of the piston 30 and also adjusting the stop position thereof is provided so as not to allow the tip portion 34a of the needle shaft 34 to abut on, to be close to, or to proceed into the opening hole 28d beyond a predetermined position, when the piston 30 and the needle shaft 34 are moved by the moving member in the above described direction.

According to the present embodiment, the first urging member 42 is provided as the moving member (urging member), and an adjustment-type stopper 44 is provided as the adjustment member.

The adjustment-type stopper 44 is fixed at an opposite side of a fixed side of the needle shaft 34 of the piston 30. The adjustment-type stopper 44 includes a stroke rod 44a provided inserting through the cap 40, and an adjustment screw 44c screwed into a screw portion 44b provided at an end portion of the stroke rod 44a. With this arrangement, when the piston 30 is moved in the direction reducing the volume in the cylinder chamber 20, the end portion (end portion at a side facing the cap 40) of the adjustment screw 44c abuts on the cap 40 to stop a movement of the piston 30. In other words, the stop position of the piston 30 (and the needle shaft 34) is defined. Further, since a distance L between the cap 40 and the above described end portion of the adjustment screw 44c can be adjusted by rotating the adjustment screw 44c, the stop position of the piston (and the needle shaft 34) can be adjusted. Note that reference signs 44d in the drawings refer to a nut for fixing the adjustment screw 44c to avoid the adjustment screw 44c from performing unintended rotation.

Incidentally, when the motor (e.g., stepping motor) is used as the moving member, since the stop position of the piston 30 (and the needle shaft 34) is adjusted under control of the motor by a control unit, the control unit and the motor constitute the adjustment member.

Note that as another embodiment, a constitution in which the adjustment member (e.g., the above described adjustment-type stopper 44) is not included may be used (not illustrated). In that case, a constitution may be used together in which a tip portion 34a is provided with a through-hole enabling the flow from the inside of the cylinder chamber 20 to the first port 12 when the tip portion 34a of the needle shaft 34 abuts on the opening hole 28d (not illustrated).

Subsequently, the third flow path 22 is provided with a second check valve 46 permitting only the flow from the first port 12 to the inside of the cylinder chamber 20. The second check valve 46 includes a valve element 46a constituted reciprocately movable in a valve box 46e provided halfway of the flow path of the third flow path 22, a valve seat 46b, an O ring 46c that is fixed to the valve element 46a and maintains the air tightness between the valve element 46a and the valve seat 46b, a second urging member (as an example, coil spring) 46d urging the valve element 46a (here, O ring 46c) in a direction bringing the valve element 46a into close contact with the valve seat 46b, and an X ring 46f that is fixed to the valve element 46a and maintains the air tightness between the valve element 46a and the valve box 46e. The second check valve 46 operates to pass the pressure fluid only in a direction indicated with the arrow C in FIG. 2.

In other words, when the pressure fluid is flown from the first port 12 side into the third flow path 22, the valve element 46a separates away from the valve seat 46b against the urging force of the second urging member 46d under the pressure of the pressure fluid to open the flow path. On the other hand, when the flow of the pressure fluid from the first port 12 side into the third flow path 22 is stopped, the valve element 46a (herein, O ring 46c) comes in close contact with the valve seat 46b by the urging force of the second urging member 46d to close the flow path. As an example, the valve element 46a is formed using the resin material, the valve seat 46b is formed integrally with the main body portion 10 using the resin material, and the O ring 46c and the X ring 46f are formed using the rubber material. Note that the O ring 46c may be constituted to be fixed on the valve seat 46b. Further, the X ring 46f may be substituted with the O ring (not illustrated).

Herein, as a characteristic constitution of the present embodiment, the third flow path 22 is formed such that a halfway portion of the flow path passes through an inside of the valve element 46a of the second check valve 46 (indicated with a reference sign 22a in the drawing). Further, the valve element 46a is provided with a third check valve 47 permitting only the flow from the first port 12 to the inside of the cylinder chamber 20 in the halfway portion 22a of the third flow path 22 formed inside.

The third check valve 47 includes a valve element 47a movably constituted in the halfway portion 22a of the third flow path 22, a valve seat 47b, and a third urging member (as an example, coil spring) 47c urging the valve element 47a in a direction bringing the valve element 47a into close contact with the valve seat 47b. As with the second check valve 46 described above, the third check valve 47 operates to pass the pressure fluid only in a direction indicated with the arrow C in FIG. 2.

In other words, when the pressure fluid is flown from the first port 12 side into the third flow path 22 (herein 22a), the valve element 47a separates away from the valve seat 47b against the urging force of the third urging member 47c under the pressure of the pressure fluid to open the flow path. On the other hand, when the flow of the pressure fluid from the first port 12 side into the third flow path 22 (herein 22a) is stopped, the valve element 47a comes in close contact with the valve seat 47b with the urging force of the third urging member 47c to close the flow path. As an example, the valve element 47a is formed using a steel ball made of stainless steel or the like, and the valve seat 47b is formed integrally with the valve element 46a of the second check valve 46 using the resin material.

As described above, the third flow path 22 is provided with the second check valve 46 and the third check valve 47 permitting only the flow from the first port 12 into the inside of the cylinder chamber 20. Particularly, the third check valve 47 is disposed inside the valve element 46a of the second check valve 46.

According to this constitution, the valve element 46a reciprocately moving in the valve box 46e performs an action of sliding with the X ring 46f interposed between the valve element 46a and the valve box 46e to maintain the air tightness. Therefore, when the flow of the pressure fluid from the first port 12 side into the third flow path 22 is stopped due to this sliding resistance, a problem occurs in which an action until the valve element 46a (herein, O ring 46c) comes in close contact with the valve seat 46b with the urging force of the second urging member 46d to close the flow path does not instantly complete. In other words, a problem is generated in which, when the embodiment is used as the fluid controller, a step cannot proceed to a subsequent step instantly, thereby causing a problem of increasing a cycle time.

As to this problem, in the present embodiment, the problem can be solved by providing the third check valve 47 including the valve element 47a that uses the steel ball capable of instantly acting upon being urged by the third urging member (as an example, coil spring) 47c, inside the valve element 46a of the second check valve 46. In other words, an operation of the third check valve 47 can be obtained for instantly closing the third flow path 22 when the flow of the pressure fluid is stopped from the first port 12 side into the third flow path 22.

Further, since an operation is generated for closing the third flow path 22 also by the second check valve 46 with a predetermined time difference, leakage of the pressure fluid can be securely avoided by a double closing structure.

Further, as described in the present embodiment, the constitution in which the third check valve 47 is provided inside the valve element 46a of the second check valve 46 can realize more compact overall apparatuses and simpler mechanisms.

Note that the second check valve 46 and the third check valve 47 are not limited to the above described constitution, but other check valve structure may be adopted (not illustrated).

Subsequently, the fourth flow path 26 is constituted such that a region at a side where the second urging member 46d is provided on the valve element 46a forms a part of the flow path in the valve box 46e that is a space portion where the valve element 46a of the second check valve 46 reciprocately moves. Further, the fourth flow path 26 is provided with the second needle valve 48 adjusting the flow rate of the flowing pressure fluid.

In other words, as illustrated in FIG. 2, the fourth flow path becomes a flow path communicating with the discharge opening 24 via the valve box 46e and the second needle valve 48 from the inside of the cylinder chamber 20 to lead to an outside of the main body portion 10. Note that, according to the present embodiment, a portion 22b connecting the valve box 46e in the third flow path 22 and the inside of the cylinder chamber 20 is used as a flow path shared with the fourth flow path 26. However, the present invention is not limited to this constitution, and a constitution may be adopted in which an exclusive flow path of the fourth flow path 26 connecting the inside of the cylinder chamber 20 and the valve box 46e is provided (not illustrated).

Herein, the characteristic constitution of the present embodiment is constitution in which the above described second check valve 46 works also as an opening and closing valve that opens and closes the fourth flow path 26. More specifically, in the valve box 46e, at a side where the second urging member 46d is provided on the valve element 46a, a valve seat 46g is provided for opening and closing the fourth flow path 26. Further, an O ring 46h that is fixed on the valve element 46a and maintains the air tightness between the valve element 46a and the valve seat 46g is provided.

Therefore, when the valve element 46a of the second check valve 46 moves in a direction for opening the third flow path 22, the valve element 46a (herein, O ring 46h) comes in close contact with the valve seat 46g to close the fourth flow path 26. On the other hand, when the valve element 46a of the second check valve 46 moves in a direction for closing the third flow path 22, the valve element 46a (herein O ring 46h) separates away from the valve seat 46g to open the fourth flow path 26. As described above, when the fourth flow path 26 is opened and closed, and when the fourth flow path 26 is opened, it operates to pass the pressure fluid in a direction indicated with the arrow D in FIG. 2.

According to this constitution, for example, a problem can be solved in which the pressure fluid that should originally flow to the discharge opening 24 via the fourth flow path 26 from the inside of the cylinder chamber 20 flows to the third flow path 22. This is because the constitution is realized in which, when the third flow path 22 is closed, the fourth flow path 26 is opened and, further, when the third flow path 22 is opened, the fourth flow path 26 is closed.

Note that, supposing that phenomenon occurs in which the pressure fluid that should flow to the fourth flow path 26 flows to the third flow path 22, for example, a problem may occur in which, even if the urging force of the second urging member 46d is applied to the valve element 46a of the second check valve 46, the pressure fluid is hard to move (i.e., the third flow path 22 is hard to closed). According to the present embodiment, as described above, the constitution including the third check valve 47 capable of acting instantly can avoid the above described problem.

However, according to the design, some overlap between the opening and closing of the third flow path 22 and that of the fourth flow path 26 may be set.

Subsequently, the second needle valve 48, more specifically, has a constitution to adjust the flow rate by allowing a tip portion 48b of a needle shaft 48a to abut on, to be close to, or to proceed into an orifice 48c having a predetermined opening to change an opening area of the orifice 48c. Herein, a screw portion 48d provided at a rear end portion of the needle shaft 48a is rotatably screwed into the main body portion 10, and the needle shaft 48a can be moved in the shaft direction by rotating an adjustment knob 48e. Therefore, a position of the tip portion 48b of the needle shaft 48a with respect to the orifice 48c, in other words, an opening area of the orifice 48c can be adjusted. Note that a position and a shape of the orifice 48c provided halfway of the flow path of the fourth flow path 26 are appropriately set, and not particularly limited.

Subsequently, actions of the speed controller 1 including the above described constitution will be described with reference to the circuit diagram in FIG. 2. As a typical example, a case will be described where, in a constitution including two speed controllers 1 (1A and 1B) to drive an external cylinder (herein, a reciprocating type cylinder) 2, the piston 2b in the cylinder 2 is moved in a direction of an arrow X1 in FIG. 2.

The pressure fluid (as an example, compressed air) is supplied from an external pressure fluid supply source 3 and supplied to a first port 12 of the speed controller 1 (1A) via a flow path 60, an electromagnetic valve 4, and a flow path 62. Note that an operation of the electromagnetic valve 4 will be described below.

First, an operation of the speed controller 1 (1A) at this time will be described.

The pressure fluid supplied to the first port 12 of the speed controller 1 (1A) flows to a second port 14 via a first check valve 28 in a first flow path 16 as indicated with the arrow A. Further, the pressure fluid is supplied into the cylinder chamber (herein, cylinder chamber $2a_1$ at one end $2b_1$ side of the piston 2b) of the cylinder 2 via the flow path 64. With this arrangement, pressure of the pressure fluid supplied into the cylinder chamber $2a_1$ operates on the one end $2b_1$ side of the piston 2b, and thus the piston 2b is driven in the X1 direction.

Together with the above described operation, the pressure fluid supplied to the first port 12 of the speed controller 1 (1A) flows in the third flow path 22 and then into the cylinder chamber 20 of the main body portion 10 as indicated with the arrow C (a flowing direction is controlled by the second check valve 46 and the third check valve 47). At this point, since the pressure of the pressure fluid supplied into the cylinder chamber 20 operates on one end 30a side of the piston 30, the piston 30 is driven in a Y1 direction against the urging force of the first urging member 42. At the same time, the pressure fluid is stored in the cylinder chamber 20.

Further, together with the above described operation, upon the piston 30 being driven in the Y1 direction, the needle shaft 34 also moves in the Y1 direction, and thus the first needle valve 32 has a state of a relatively large opening level (state where a narrowing operation is not generated). Accordingly, the pressure fluid flowing from the first port 12 to the second port 14 can flow by making the most use of two flow paths of the first flow path and the second flow path.

Subsequently, an operation of the speed controller 1 (1B) at this time will be described.

When the piston 2b is driven in the X1 direction by the above described operation, the pressure fluid flown from the cylinder 2 is supplied to the second port 14 of the speed controller 1 (1B) via a flow path 66. Now, with the speed controller 1 (1B), the action speed (shaft-direction moving speed) of the piston 2b of the cylinder 2 can be adjusted (controlled) by adjusting the flow velocity (i.e., flow rate) of the pressure fluid flown into the second port 14 from the flow path 66, and then flown from the first port 12 to a flow path 68. In other words, when the flow velocity of the pressure fluid passing in the speed controller 1 (1B) (more specifically, inside the second flow path 18) is high (i.e., high flow rate per unit time), the action speed (shaft-direction moving speed) of the piston 2b of the cylinder 2 becomes high. On the other hand, when the flow velocity of the pressure fluid is low (i.e., low flow rate per unit time), the action speed (shaft-direction moving speed) of the piston 2b of the cylinder 2 becomes low.

The pressure fluid supplied to the second port 14 of the speed controller 1 (1B), as indicated with the arrow B, flows to the first port 12 via the first needle valve 32 in the second flow path 18. Note that the pressure fluid flown from the first port is output into the air via the flow path 68 and the electromagnetic valve 4.

Herein, as normal setting, at a time point when the piston 2b of the cylinder 2 starts to move in the X1 direction, the pressure fluid is stored in the cylinder chamber 20 of the speed controller 1 (1B) and set to be in a state where the piston 30 has moved to a predetermined position in the Y1 direction. (The operation for being stored is the same as that of the speed controller 1 (1A) described above.)

Therefore, at a time point when the piston 2b of the cylinder 2 starts to move in the X1 direction, in other words, at a time point when the pressure fluid flown from the cylinder 2 starts to pass through in the second flow path 18, the piston 30 has moved up to the predetermined position in the Y1 direction, and the needle shaft 34 has also moved in the Y1 direction. Thus, the first needle valve 32 has a state of relatively large opening level (state where the narrowing operation is not generated). At this point, the flow velocity of the pressure fluid passing through in the first needle valve 32, that is, the second flow path 18 is relatively high (i.e., high flow rate per unit time). In other words, the action speed (shaft-direction moving speed) of the piston 2b of the cylinder 2 becomes high.

Together with the operation described above, the pressure fluid stored in the cylinder chamber 20 of the speed controller 1 (1B) flows from the inside of the cylinder chamber 20 to the discharge opening 24 via the valve box 46e and the second needle valve 48 in the fourth flow path 26, and then discharged (flown) outside the main body portion 10 as indicated with the arrow D. At this point, the pressure fluid stored in the cylinder chamber 20 is reduced, in other words, the pressure operating at the one end 30a side of the piston 30 is lowered, and thus the urging force of the first urging member 42 operating at the other end 30b side of the piston 30 becomes larger than the above described pressure, so that the piston 30 starts to move with the above described urging force in the Y2 direction.

Herein, by adjusting, with the second needle valve 48, the flow velocity (i.e., flow rate per unit time) of the pressure fluid flowing from the inside of the cylinder chamber 20 to the discharge opening 24, the action speed (shaft-direction moving speed) of the piston 30 and the needle shaft 34 fixed on the piston 30 in the Y2 direction can be adjusted (controlled). In other words, when the flow velocity of the pressure fluid passing through in the fourth flow path 26 (more specifically, second needle valve 48) is high (i.e., high flow rate per unit time), the action speed (shaft-direction moving speed) of the piston 30 and the needle shaft 34 becomes high. On the other hand, when the flow velocity of the pressure fluid is low (i.e., low flow rate per unit time), the action speed (shaft-direction moving speed) of the piston 30 and the needle shaft 34 becomes low.

Subsequently, when the piston 30 moves to a predetermined position in the Y2 direction, the tip portion 34a of the needle shaft 34 fixed on the piston 30 is in a state of abutting on, being close to, or proceeding into a predetermined position of the opening hole 28d. At this point, an adjustment operation, in other words, the narrowing operation of a passing flow-rate as the first needle valve 32 is generated. More specifically, since the first needle valve 32 has a state of a relatively small opening level (state of generating the narrowing operation), the flow velocity of the pressure fluid passing through the first needle valve 32, in other words, in the second flow path 18 is relatively slow (i.e, low flow rate per unit time). In other words, the action speed (shaft-direction moving speed) of the piston 2b of the cylinder 2 becomes low (switched from the high speed to the low speed). As described above, the action speed of the cylinder 2 can be adjusted (controlled) in a step-wise manner (herein, two steps of the high speed and the low speed). Note that the predetermined position (stop position) of the piston 30 in the Y2 direction is, as described above, defined and adjusted by an adjustment-type stopper 44.

As described above, the flow velocity (flow rate) of the pressure fluid passing through in the fourth flow path 26 can be adjusted by adjusting the opening area of the second needle valve 48, in other words, the flow velocity (flow rate) of the passing-through pressure fluid. With this arrangement, the action speed (shaft-direction moving speed) of the piston 30 of the main body portion 10 in the Y2 direction can be adjusted. Therefore, timing when the narrowing operation of the passing-through flow rate in the first needle valve 32 starts to be generated can be adjusted. In other words, timing when the action speed (shaft-direction moving speed) of the piston 2b of the cylinder 2 switches from a high-speed movement to a low-speed movement can be adjusted to be advanced or delayed.

On the other hand, by adjusting, with the adjustment-type stopper 44, the predetermined position (stop position) of the piston 30 in the Y2 direction, the opening area of the first needle valve 32, in other words, the flow velocity (flow rate) of the passing-through pressure fluid can be adjusted. In other words, the flow velocity (flow rate) of the pressure fluid passing through in the second flow path 18 can be adjusted. Therefore, after the action speed (shaft-direction moving speed) of the piston 2b of the cylinder 2 switches from the high-speed movement to the low-speed movement, the moving speed at the low-speed side can be adjusted. In other words, since the speed right before the piston 2b stops can be adjusted to be as low speed as desired, a shock when the cylinder stops can be reduced.

Subsequently, the piston 2b of the cylinder 2 will be briefly described when it is moved in an arrow X2 direction opposite to the arrow X1 direction in FIG. 2.

To move the piston 2b in the arrow X2 direction, the electromagnetic valve 4 is made to operate to switch the circuit and the pressure fluid is supplied to the speed controller 1 (1B), which is located opposite to that in the example described above. More specifically, the pressure fluid (as an example, compressed air) may be supplied from the external pressure fluid supply source 3 to the first port 12 of the speed controller 1 (1B) via the flow path 60, the electromagnetic valve 4, and the flow path 68.

The pressure fluid supplied to the first port 12 of the speed controller 1 (1B) flows in the first flow path 16 to flow to the second port 14 via the first check valve 28. Further, the pressure fluid is supplied into the cylinder chamber (herein, a cylinder chamber $2a_2$ at other end $2b_2$ side of the piston 2b) of the cylinder 2 via the flow path 66. With this arrangement, since the pressure of the pressure fluid supplied into the cylinder chamber $2a_2$ operates on the other end $2b_2$ side of the piston 2b, the piston 2b is driven in the X2 direction.

Note that, since the detailed operation and effect are the same as those when the pressure fluid is supplied to the above described speed controller 1 (1A), they will not be repeatedly described.

As described above, when the pressure fluid is supplied to the first port 12 of the speed controller 1 (1A) from the external pressure fluid supply source 3 by switching the circuits of the electromagnetic valve 4, the piston 2b of the cylinder 2 can be moved in the arrow X1 direction. When the pressure fluid is supplied to the first port 12 of the speed controller 1 (1B) from the external pressure fluid supply source 3, the piston 2b of the cylinder 2 can be moved in the arrow X2 direction. Therefore, the reciprocating type cylinder 2 can be reciprocately driven.

(Modification)

Figure 3:
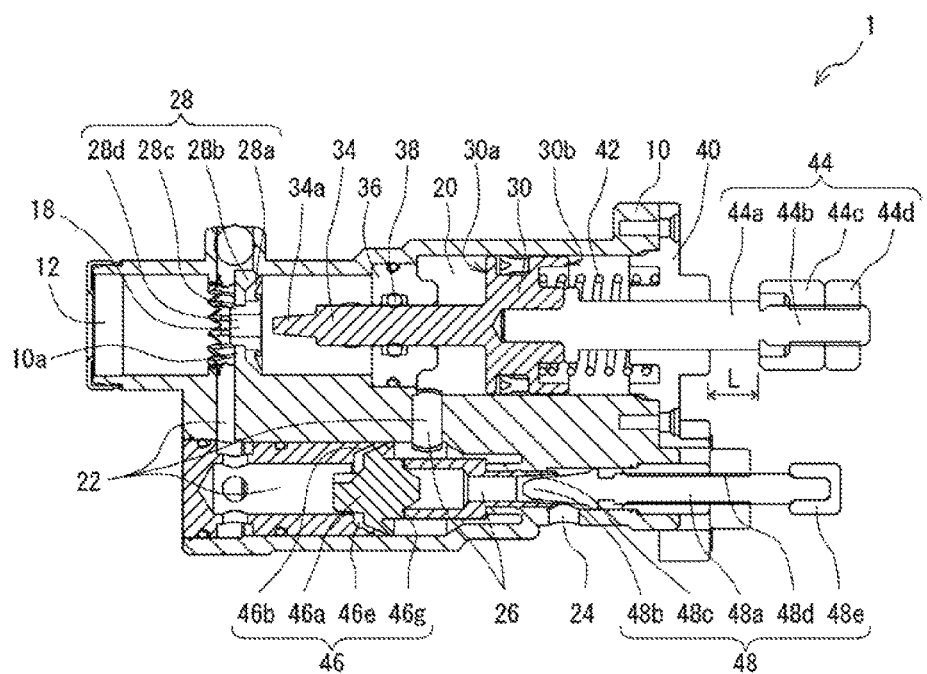
FIG. 3 is a schematic diagram illustrating a modification of the speed controller according to the embodiment of the present invention.

Subsequently, FIG. 3 illustrates a modification of the second check valve 46. Herein, FIG. 3 illustrates positions corresponding to those illustrated in FIG. 1A described above. The characteristic constitution of the present modification will be mainly described below. The second check valve 46 does not include the third check valve 47, but includes the valve element 46a and a valve seat 46b that are constituted to be reciprocately movable in the valve box 46e provided halfway of the third flow path 22. As an example, the valve element 46a is formed using rubber material such as NBR, and the valve seat 46b is formed using resin material.

According to this constitution, when the pressure fluid is flown into the third flow path 22 from the first port 12 side, the valve element 46a moves so as to separate from the valve seat 46b with the pressure of the pressure fluid, and separates away also from an inner wall of the third flow path 22 to open the flow path (third flow path 22). On the other hand, when the flow of the pressure fluid into the third flow path 22 from the first port 12 side is stopped, the valve element 46a abuts on the inner wall of the third flow path 22 with the pressure of the pressure fluid stored in the cylinder chamber 20, and also moves toward the valve seat 46b to come in close contact with the valve seat 46b so as to close the flow path (third flow path 22).

Further, the second check valve 46 according to the present modification same as the embodiment described above has a structure also working as the opening and closing valve that opens and closes the fourth flow path 26.

More specifically, the valve seat 46g is provided for opening and closing the fourth flow path 26.

Therefore, if the valve element 46a of the second check valve 46 moves in a direction for opening the third flow path 22, the valve element 46a comes in close contact with the valve seat 46g to close the fourth flow path 26. On the other hand, if the valve element 46a of the second check valve 46 moves in a direction for closing the third flow path 22, the valve element 46a separates away from the valve seat 46g to open the fourth flow path 26.

Note that, since other basic constitution and operation about the second check valve 46 according to the present modification are the same as those of the embodiment described above, they will not be repeatedly described.

As described above, according to the disclosed speed controller, the action speed (moving speed) of the external cylinder 2 in one stroke can be adjusted (controlled) in a step-wise manner (two steps). In other words, the piston 2b of the cylinder 2 is moved at a high speed for a while since it has started moving to shorten the action time. Further, since the moving speed of the piston 2b is switched from the high speed to the low speed at desired timing before the piston 2b stopes, the shock when the piston 2b of the cylinder 2 stops can be reduced without using the shock absorber. Further, both the timing for switching the moving speed of the piston 2b from the high speed to the low speed and the speed at the low speed side can be adjusted.

Further, the present modification is realized by a simple structure using the component used as both the first check valve and the first needle valve, and thus for both component costs and production costs, cutting the costs can be attained.

Furthermore, with the constitution in which the third check valve is provided inside the valve element of the second check valve, the problem can be solved in which, when the flow of the pressure fluid into the third flow path from the first port side is stopped, the action until the valve element comes in close contact with the valve seat with the urging force of the second urging member to close the flow path does not instantly complete. Therefore, since the process can move instantly to the next process in the fluid control, the cycle time can be reduced. Moreover, the more compact overall apparatus and the simpler mechanisms also can be realized.

Further, a constitution can be realized in which, when the third flow path is closed, the fourth flow path is opened, and, when the third flow path is opened, the fourth flow path is closed. Therefore, a problem can be solved, for example, in which the pressure fluid that originally should be flown to the discharge opening from the cylinder chamber via the fourth flow path flows to the third flow path.

Note that the present invention is not limited to the embodiments described above, but can be changed in various ways within the scope of the present invention.

What is claimed is:

1. A speed controller comprising:
   a first flow path and a second flow path configured to allow a first port and a second port each included in a main body portion to be in communication with each other so as to flow pressure fluid,
   the first flow path including a first check valve permitting only flow from the first port to the second port,
   the second flow path including a first needle valve for adjusting a flow rate of the flowing pressure fluid,
   the second flow path being configured to include an opening hole that opens at a center position of the first check valve in a radial direction as a part of the flow path, the first needle valve adjusting the flow rate by allowing a tip portion of a needle shaft to abut on, to be close to, or to proceed into the opening hole so as to change an opening area of the opening hole, the needle shaft being fixed on a piston reciprocately-movably disposed in a cylinder chamber included in the main body portion and also protruding outside the cylinder chamber; and further a third flow path configured to allow the first port and the cylinder chamber to be in communication with each other so as to flow the pressure fluid, the third flow path including a second check valve permitting only flow from the first port to the cylinder chamber.

2. The speed controller according to claim 1, further comprising:

a fourth flow path configured to allow the cylinder chamber and a discharge opening provided in the main body portion to be in communication with each other to flow the pressure fluid, wherein the second check valve functions also as an opening and closing valve of the fourth flow path for closing the fourth flow path by movement of a valve element in a direction opening the third flow path and for opening the fourth flow path by movement of the valve element in a direction closing the third flow path.

3. The speed controller according to claim 2, wherein the third flow path is formed such that a halfway portion of the flow path passes through inside of the valve element of the second check valve; and wherein the valve element is provided with a third check valve permitting only the flow from the first port to the cylinder chamber in the third flow path formed inside.

4. The speed controller according to claim 2, wherein the fourth flow path includes a second needle valve for adjusting the flow rate of the flowing pressure fluid.

5. The speed controller according to claim 3, wherein the fourth flow path includes a second needle valve for adjusting the flow rate of the flowing pressure fluid.

6. The speed controller according to claim 1, comprising a moving member configured to move the piston in a direction decreasing volume of the cylinder chamber, and also in a direction allowing the tip portion of the needle shaft to abut on, to be close to, or to proceed into the opening hole.

7. The speed controller according to claim 6, comprising an adjustment member capable of defining and adjusting a stop position of the piston so as not to allow the tip portion of the needle shaft to abut on, to be close to, or to proceed into the opening hole beyond a predetermined position, when the piston is moved by the moving member.

* * * * *